United States Patent
Keyes

(10) Patent No.: US 7,070,384 B2
(45) Date of Patent: Jul. 4, 2006

(54) APPARATUS AND METHOD FOR AUTOMATICALLY UNLOADING BRICK FROM KILN CARS AND PREPARATION FOR SHIPMENT

(75) Inventor: Robert W. Keyes, Corbin, KY (US)

(73) Assignee: General Shale Products, LLC, Johnson City, TN (US)

( * ) Notice: Subject to any disclaimer, the term of this patent is extended or adjusted under 35 U.S.C. 154(b) by 251 days.

(21) Appl. No.: 10/660,695

(22) Filed: Sep. 12, 2003

(65) Prior Publication Data

US 2005/0056521 A1    Mar. 17, 2005

(51) Int. Cl.
*B65G 57/00* (2006.01)

(52) U.S. Cl. ............... 414/789.8; 414/788.1; 414/788.4; 414/792.9; 198/374; 198/430; 198/432; 198/434

(58) Field of Classification Search ............ 414/789.8, 414/788, 788.1, 788.4, 792.9; 198/374, 430, 198/432, 434
See application file for complete search history.

(56) References Cited

U.S. PATENT DOCUMENTS

| | | | |
|---|---|---|---|
| 4,002,372 A | | 1/1977 | Edwards et al. |
| 4,085,976 A | | 4/1978 | Edwards et al. |
| 4,182,442 A | * | 1/1980 | Jones ...................... 198/418.3 |
| 4,278,378 A | * | 7/1981 | Milholen .................. 414/788.4 |
| 4,360,100 A | * | 11/1982 | Kamphues ................... 198/458 |
| 5,443,357 A | * | 8/1995 | Leeds et al. ............. 414/792.9 |

* cited by examiner

*Primary Examiner*—Joe Dillon, Jr.
(74) *Attorney, Agent, or Firm*—Reed Smith LLP; Stanley P. Fisher, Esq.; Juan Carlos A. Marquez, Esq.

(57) ABSTRACT

Apparatus and methods for unloading and binding brick or other components include an infeed conveyor that delivers layers of brick to a transfer distribution carriage. The distribution carriage repositions the brick layers on either an outfeed conveyor or a tine conveyor. The layers of bricks carried by the outfeed conveyor are moved to where a tine layer is positioned on their upper surface. The tine conveyor divides the bricks into an arrangement of rows spaced apart to define openings for receiving a lifting or moving member, so that when the tine layer is positioned in a completed stack, enables movement of the stack by a forklift or other suitable moving means. Additional layer or layers are then positioned on the tine row on a packaging conveyor so that completed stacks are delivered to a package station that binds the stack of bricks or other components into an integrated structure.

47 Claims, 10 Drawing Sheets

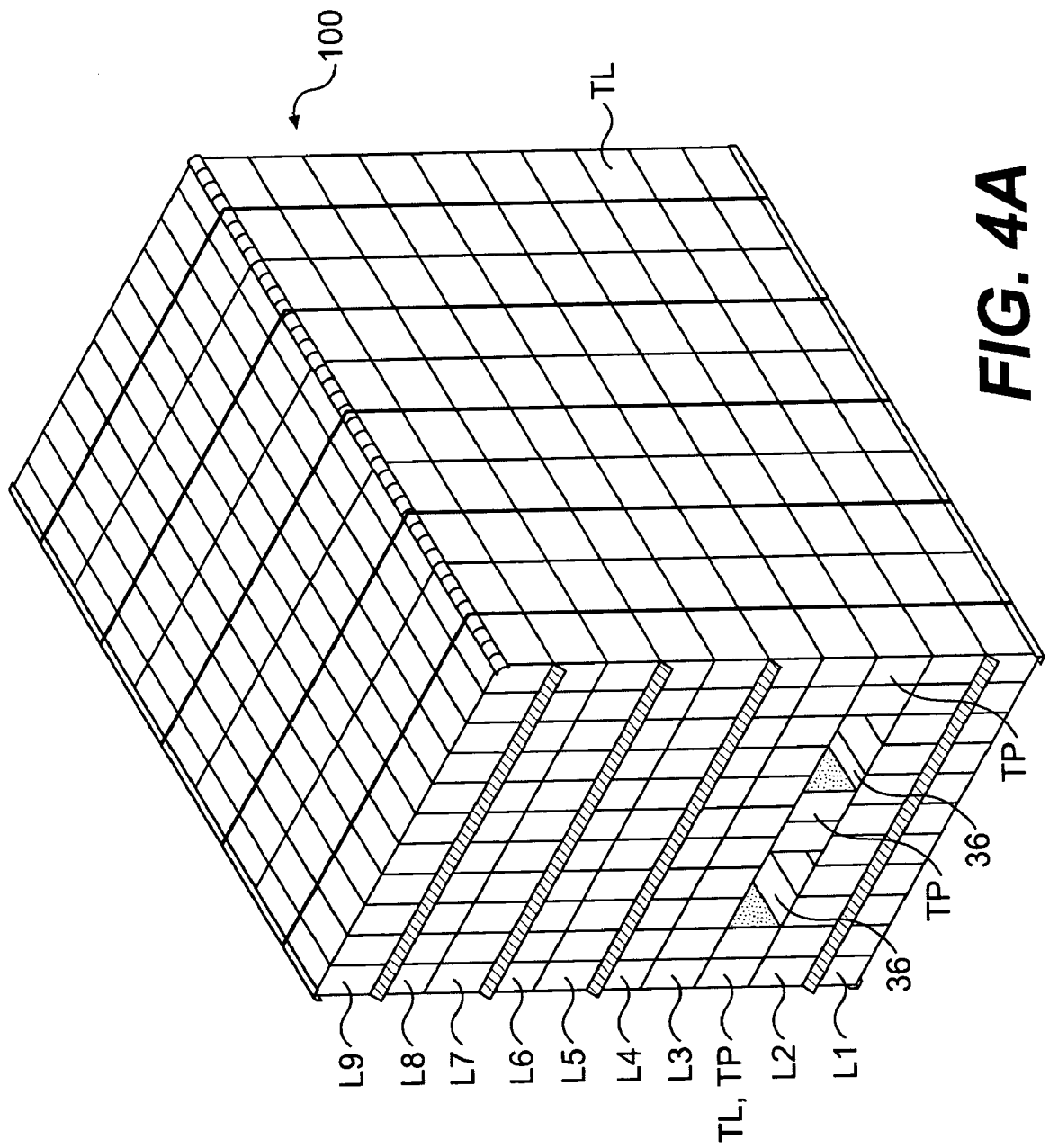

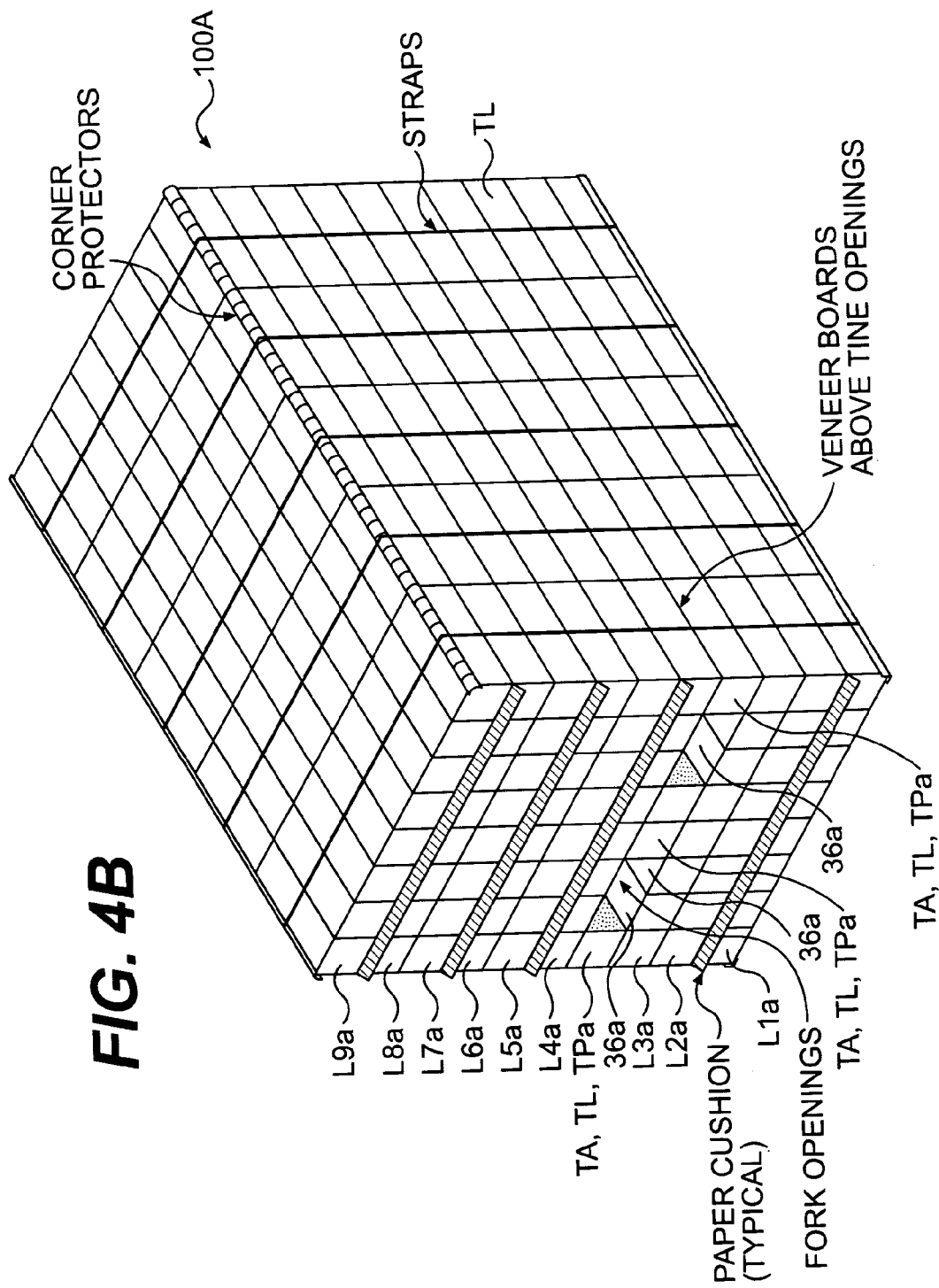

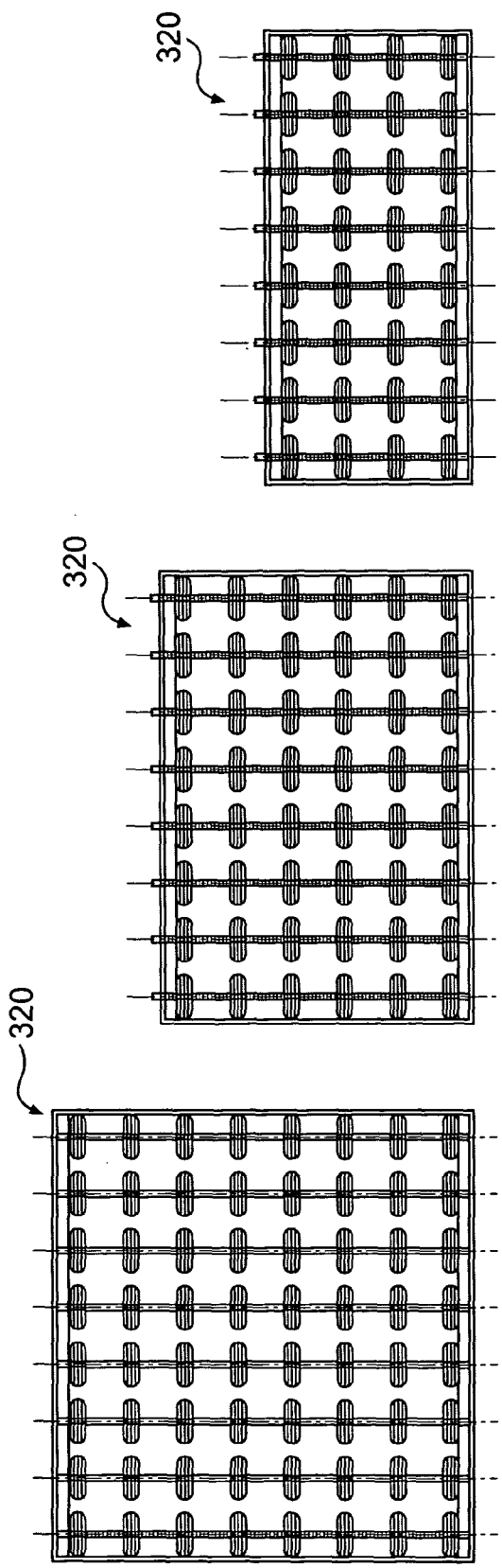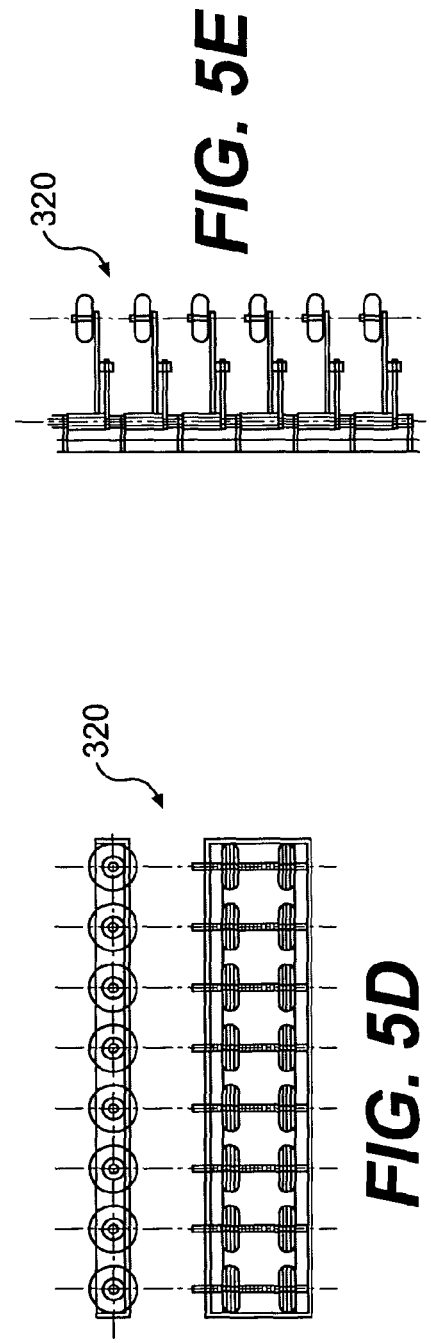
FIG. 5A  FIG. 5B  FIG. 5C  FIG. 5D  FIG. 5E

APPARATUS AND METHOD FOR AUTOMATICALLY UNLOADING BRICK FROM KILN CARS AND PREPARATION FOR SHIPMENT

BACKGROUND OF THE INVENTION

1. Field of the Invention

The present invention relates to the field of brick handling and packaging. More specifically, the present invention relates to an apparatus and method for automatically unloading kiln cars and stacking the unloaded brick in proper size plastic band strapped bundles having forklift tine receiving openings for enabling subsequent handling for shipment.

2. Description of the Related Art

It is a current practice in the brick industry to manually unload brick from kiln cars and to manually stack the brick in bundles for binding and/or packaging for shipment. These activities are extremely labor intensive and require as many as 15 employees in an average brick producing facility. Also, these jobs involve extensive lifting of heavy brick and back and other injuries frequently result in down time and attendant worker compensation losses can be substantial. It is therefore understandable that the nature of the work required in these jobs can result in a very high turnover rate of employees.

While the foregoing problems have been recognized for many years, no satisfactory solution has evolved in the brick industry prior to the present invention.

SUMMARY OF THE INVENTION

It is a primary object of the present invention to provide new and improved equipment and methods for unloading brick from kiln cars and assembling the brick units into a bundle bonded with plastic bands so as to be ready for shipment to the customer.

Yet another object of the invention is the provision of an automatic system for unloading brick from kiln cars and rearranging the brick in bundles substantially without the use of any manual labor.

Yet another object of the invention is the provision of equipment for automatically removing brick from kiln cars and arranging the brick in bundles including tine receiving openings positioned to receive the tines of a fork lift for enabling repositioning of the bundles in an efficient manner.

Achievement of the foregoing objects is enabled by providing one robot or a plurality of robots, desirably two robots, positioned adjacent the forward end of a kiln car and each having booms supporting a pair of vertically oriented power activated stack clamps which can be positioned over one or more layers of bricks, desirably the two upper layers of brick stacks, in the kiln car. Actuation of the stack clamps effect clamping of the one or more layers of brick, desirably the two upper layers of brick, of a kiln car stack. The clamped layer or layers are then lifted and positioned for deposit on an infeed conveyor. The infeed conveyor delivers layer or layers of brick, desirably the two brick layers, to an unloading position beneath a transfer distribution carriage positioned for transverse movement between a forward position and a rearward position over the unloading position on the infeed conveyor. The distribution carriage has two pick up heads, each of which has two facing brick layer clamp members that can be lowered over the layer or layers of brick in stacks in the unloading position on the infeed conveyor for clamping and repositioning the brick layer or layers on either an outfeed conveyor extending longitudinally of the assembly parallel to and rearwardly adjacent the infeed conveyor or a longitudinally oriented tine conveyor extending longitudinally of the assembly parallel to and forwardly adjacent the infeed conveyor.

The plurality of layer stacks of bricks, desirably two-layer stacks or bricks, are separated into single layers most of which are carried by the distribution carriage to the outfeed conveyor where they are positioned for movement forward of the assembly to a downfeed position where a tine layer is positioned on their upper surface. A substantially smaller number of the layers delivered to the unloading position on the infeed conveyor are positioned on a tine conveyor and are oriented transversely to the assembly and are moved forwardly where they are divided into tine row pairs, or other alternating arrangement of rows, such as a double-single-double row arrangement, spaced apart to form a tine receiving layer, the spaced apart rows defining tine receiving openings or apertures, the tine receiving openings or apertures for respectively receiving a clamping, lifting or moving member, such as the tine or tines of a forklift, when positioned in a completed stack so as to enable movement of the stack by the forklift or by other suitable moving means, such as by a crane or robot.

The one or more robots also remove double layer stack components, such as the bricks, from the kiln car and deposit them on a packaging conveyor driven transversely of the assembly in a rear to front direction. The one or more robots then remove a single tine layer from the outfeed conveyor and deposit it on the two layer stack, or other suitable stack arrangement, previously positioned on the packaging conveyor. Additional layer or layers are then positioned on the tine row or layer on the partial stack on the packaging conveyor while it continues to move forwardly and new stacks are formed in a trailing position behind the leading stack or leading stacks that follow a first, or original, stack so that completed stacks are delivered from the downstream end of the packaging conveyor to the package station including a moveable carriage which moves at the same speed as the packaging conveyor and applies straps, or other suitable fastening means, about the brick stacks which have previously been oriented by a suitable orienting means, such as by free-compressor plates and regular compressor plates. The package of the components, such as bricks, is at that point completed.

Although various preferred embodiments of the invention are explained in detail, it is to be understood that other embodiments are possible. Accordingly, it is not intended that the invention is to be limited in its scope by the appended claims, nor by the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Further, the methods and apparatus of the present invention can also be used for unloading, arranging or packaging various components in addition to bricks, such as for shipment or storage. Such components could include, for example, blocks or other modular components, tubes, rods, pipes, boxes or packaging cartons, or the like, which can be of various materials, such as a plastic material, a cardboard material, wood, and a metal or ceramic type material.

BRIEF DESCRIPTION OF THE DRAWINGS

Preferred structural system embodiments, preferred subcomponents, method steps and procedures of this invention are disclosed in the accompanying drawings, wherein like reference numerals designate or describe like or similar elements, and wherein:

FIG. 4A is a perspective view of a typical modular brick package formed by the inventive assembly and method;

FIG. 4B is another perspective view of a typical modular brick package formed by the inventive assembly and method;

FIG. 5A is an elevation view of an eight brick section of guide rollers used in forming a typical modular brick package by the inventive assembly and method;

FIG. 5B is an elevation view of a six brick section of guide rollers used in forming a typical modular brick package by the inventive assembly and method;

FIG. 5C is an elevation view of a four brick section of guide rollers used in forming a typical modular brick package by the inventive assembly and method;

FIG. 5D is an elevation view of a two brick section of guide rollers used in forming a typical modular brick package by the inventive assembly and method; and FIG. 5E is a side elevation view of the conveyor roller guides of FIG. 5B used in forming a typical modular brick package by the inventive assembly and method.

DESCRIPTION OF THE PREFERRED EMBODIMENTS

Apparatus and Methods of the System

Figure 3A:
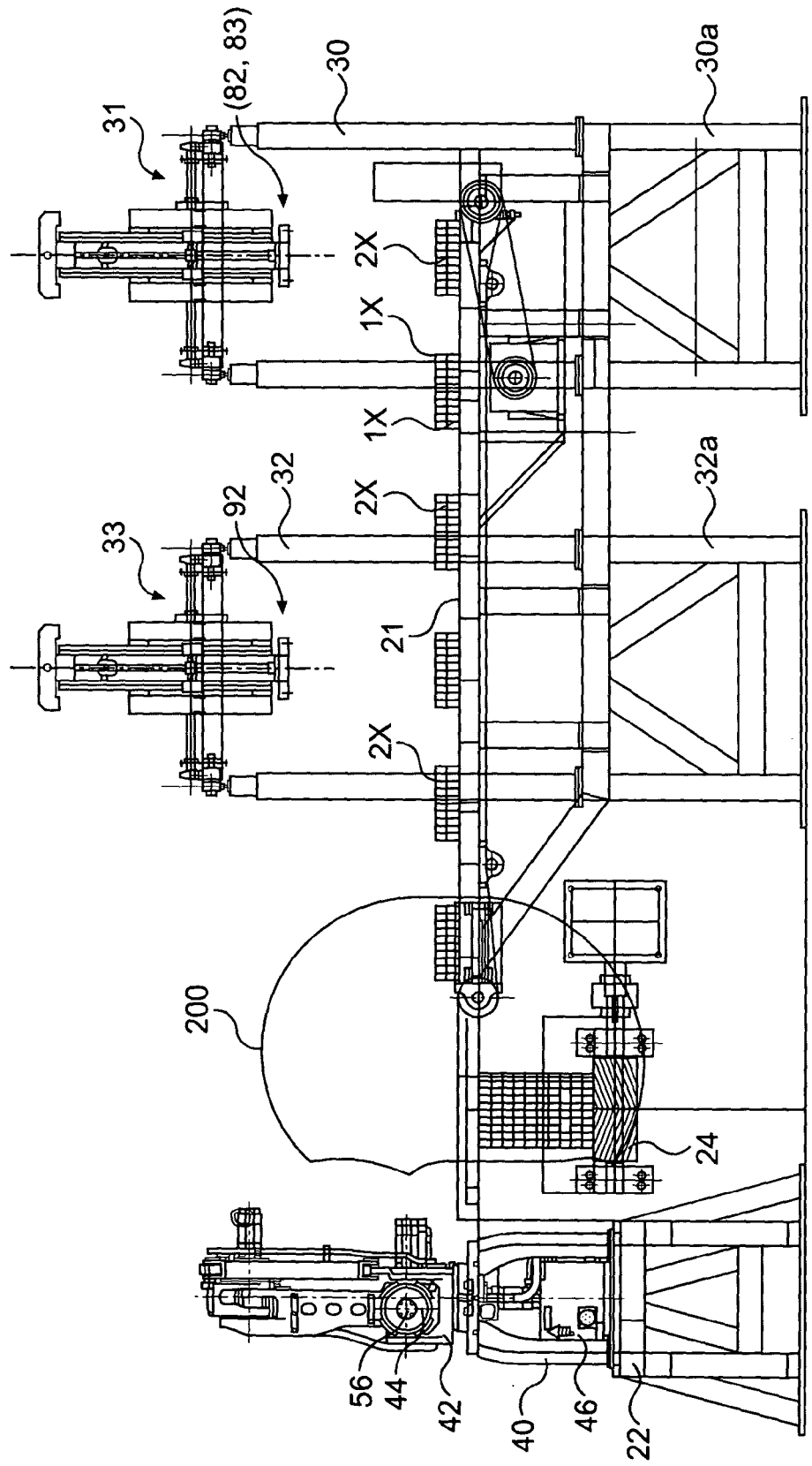
FIG. 3A is an elevation view of the distribution carriage structure employed in the preferred embodiments.
Figure 3B:
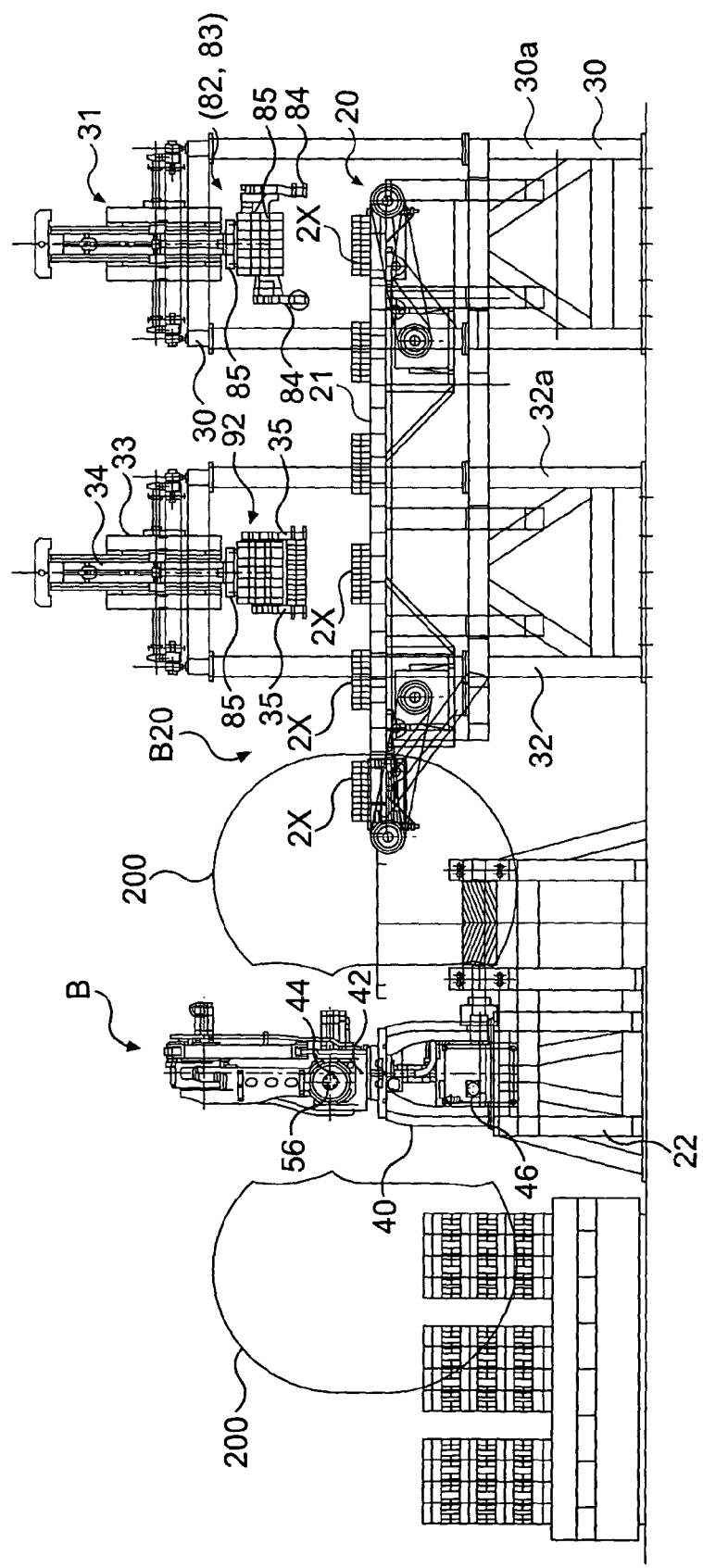
FIG. 3B is another elevation view of the distribution carriage structure employed in the preferred embodiments.

With reference to the figures, like reference characters will be used to indicate like elements throughout the several embodiments and views thereof. In particular, with reference to FIGS. 1A, 1B and 1C, the present invention is directed to a system for automatically unloading and stacking bricks 2 or other components 2, and then strapping the bricks 2 or other components 2 into bundles for shipment. The system is implemented in an assembly 10 that includes an upstream portion or left portion 12 of the operation which receives brick 2 from a kiln car 14, and a downstream or right portion 16 of the operation longitudinally spaced from the upstream portion 12. The assembly further includes a rear portion 18 and a front portion 19 which are separated by a centrally longitudinally extending infeed belt conveyor 20 having an upper horizontal flight 21 as shown in FIG. 3B. The significance of the aforementioned upstream, downstream, front and rear portions is that they provide a basis for accurately describing the relative positions of components of the preferred embodiment and the movement of such components 2, such as bricks 2, being handled by the assembly.

Figure 1A:
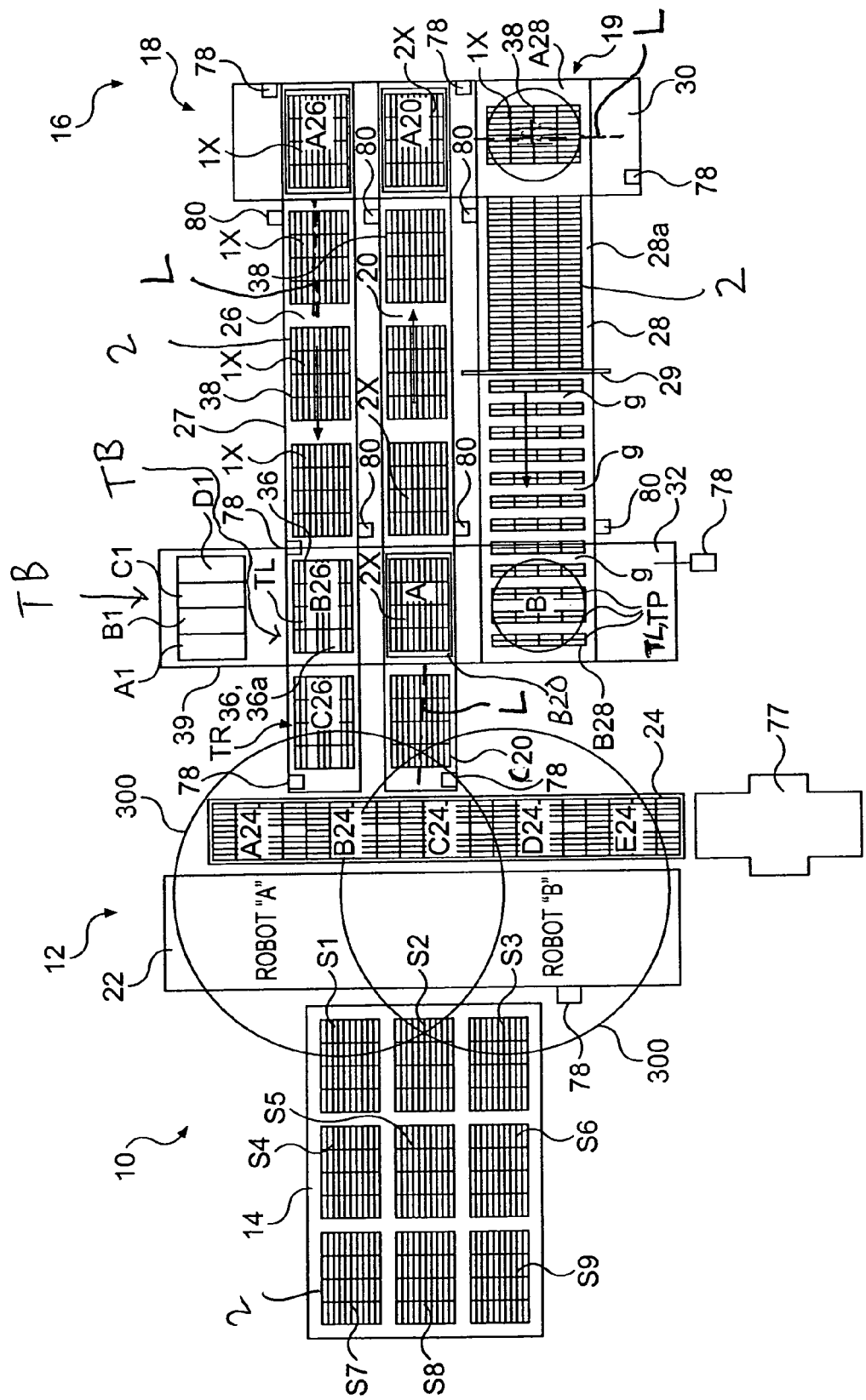
FIG. 1A is a plan view of the layout of the major apparatus of a first preferred embodiment of the invention.
Figure 1B:
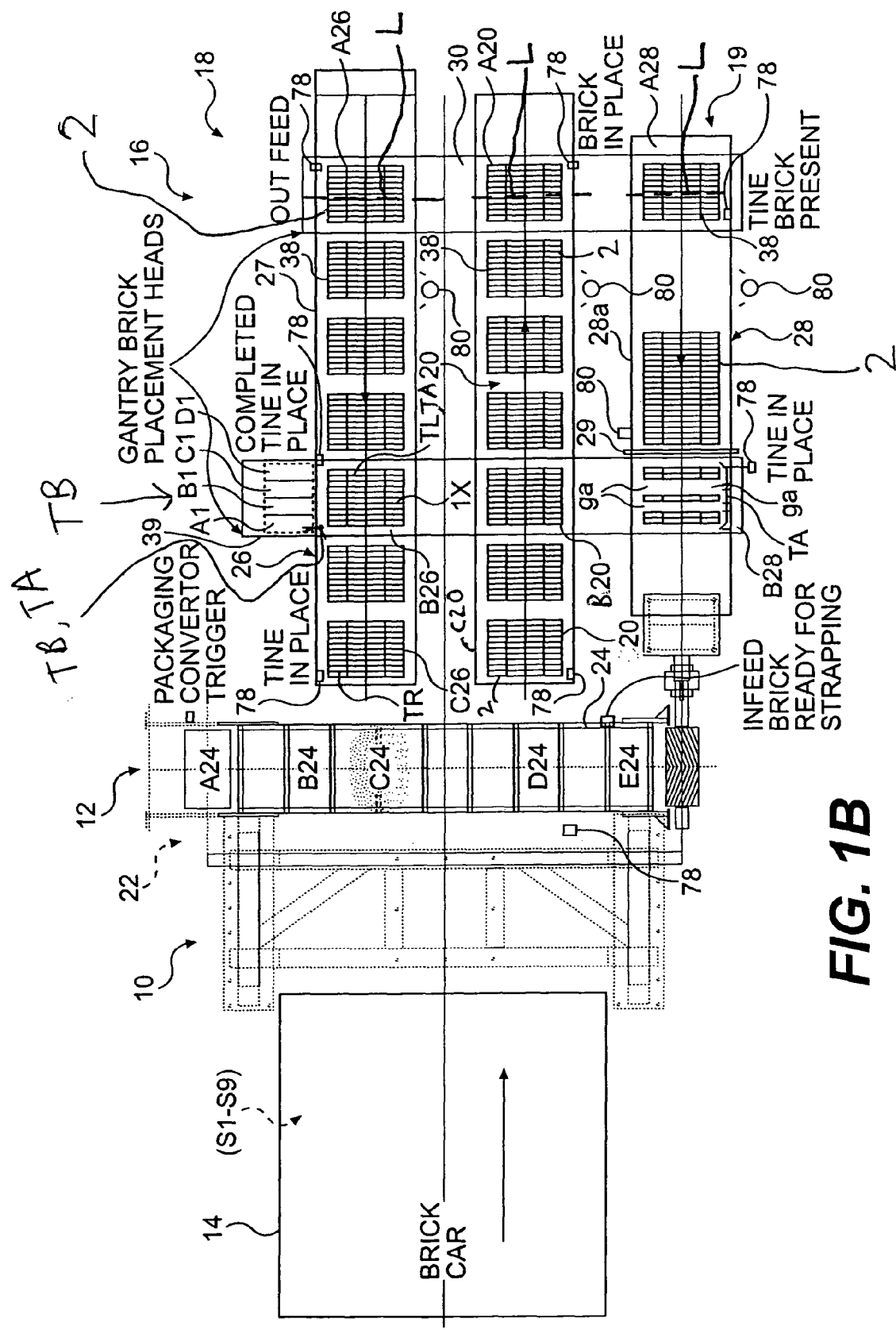
FIG. 1B is a plan view of the layout of the major apparatus of a second preferred embodiment of the invention.
Figures 1C, 1D:
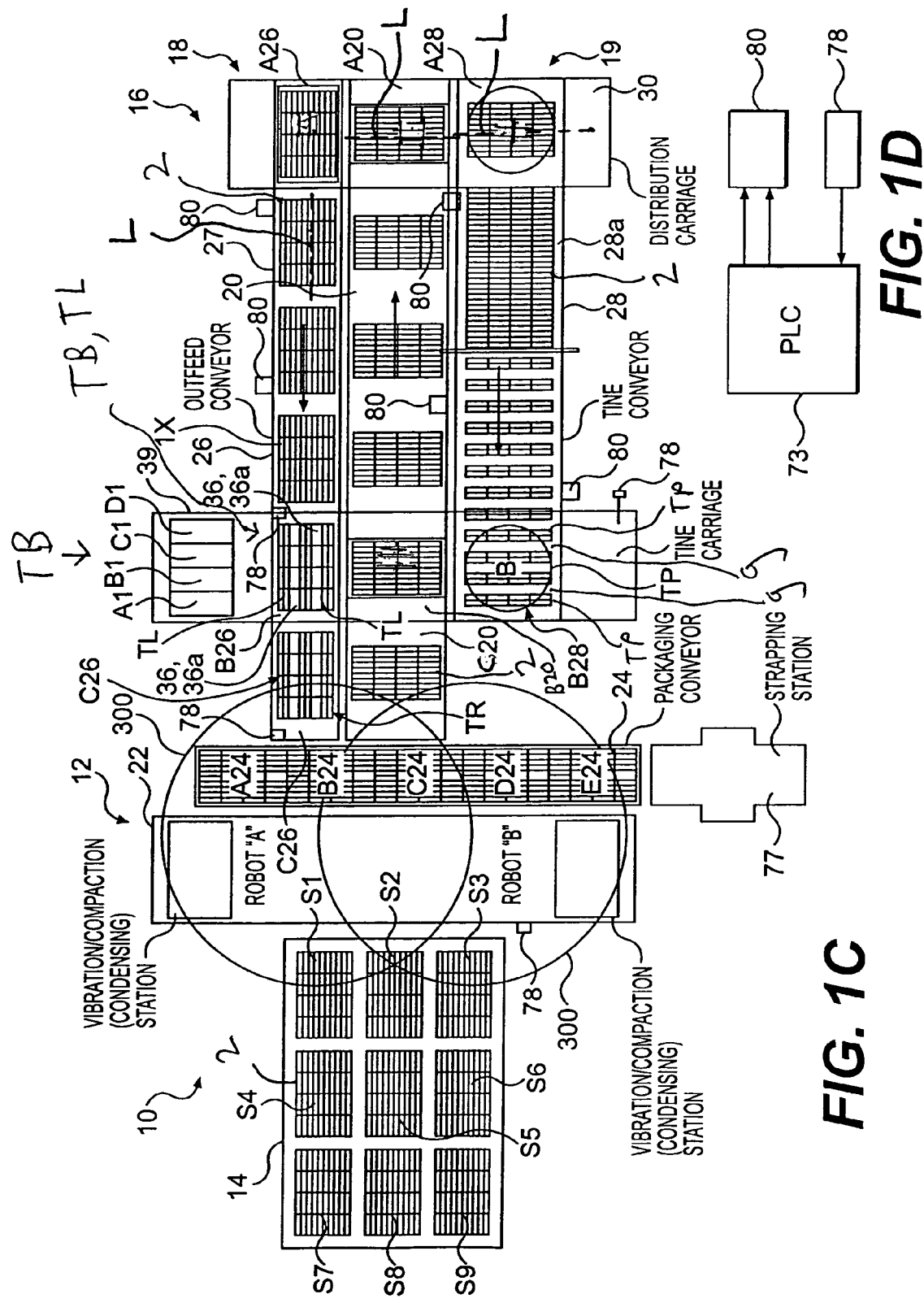
FIG. 1C is a plan view of the layout of the major apparatus of a third preferred embodiment of the invention.
FIG. 1D is a simplified flow diagram of the control system controlling all functions of the preferred embodiments.
Figure 2A:
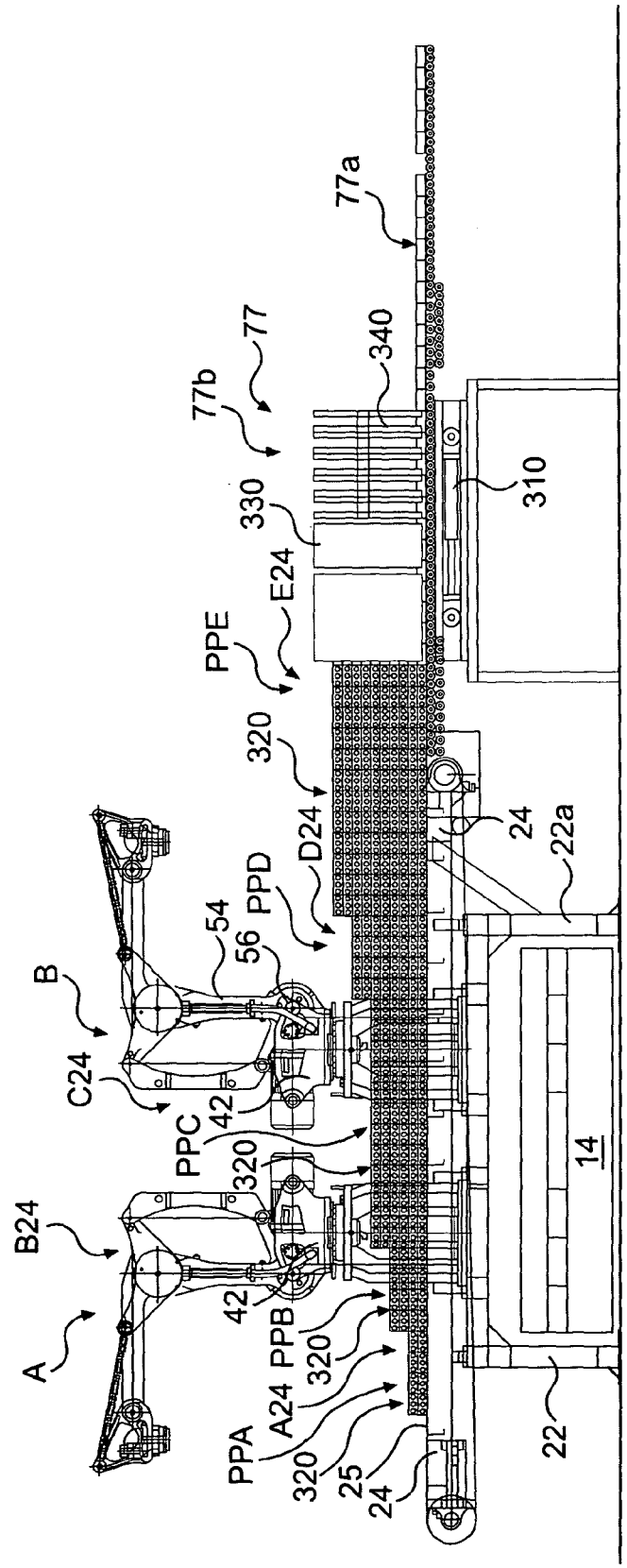
FIG. 2A is a left elevation view illustrating the robots and packaging conveyor employed in the preferred embodiments.
Figure 2B:
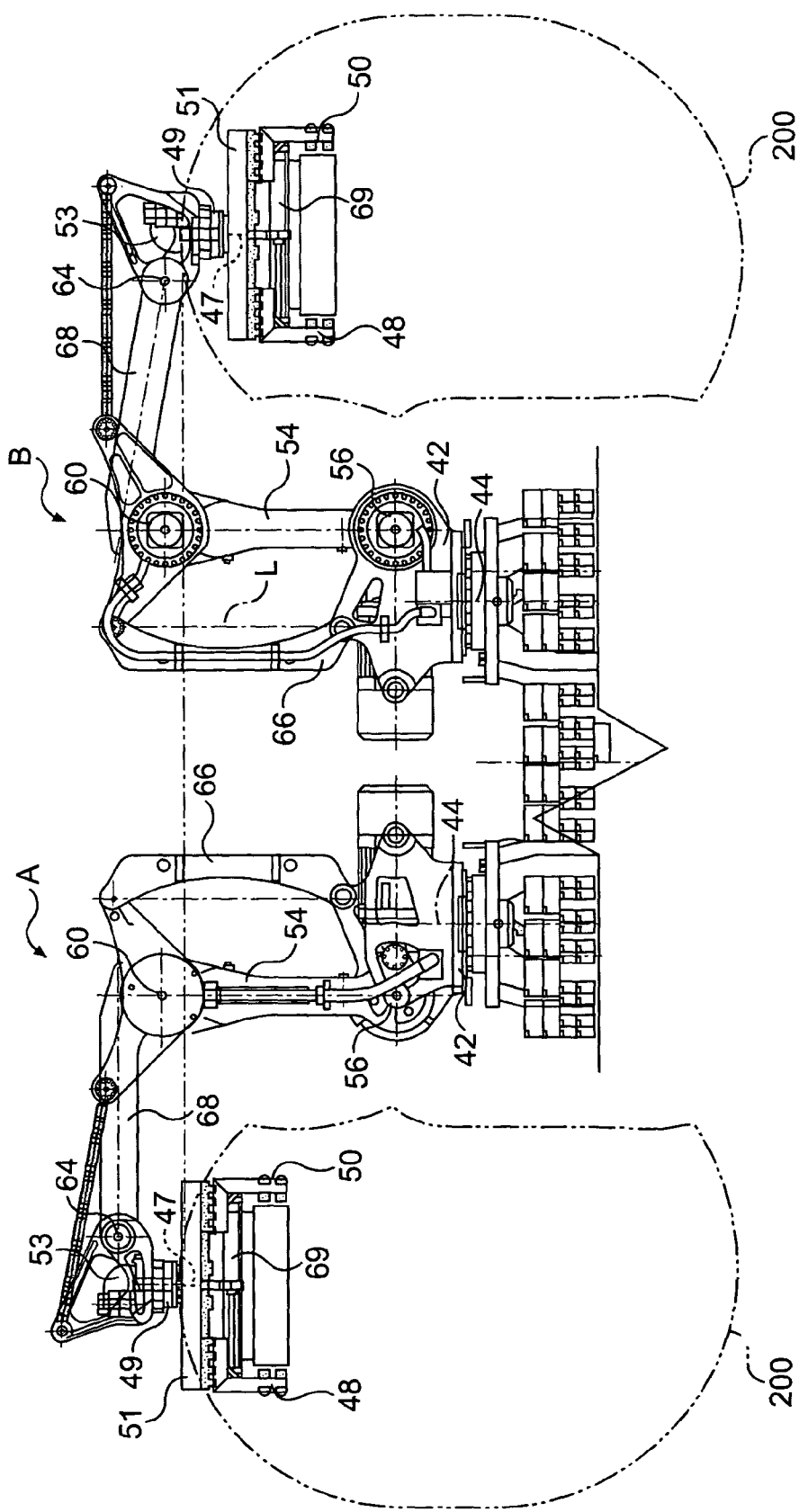
FIG. 2B is an enlarged front elevation view of the two robots employed by the preferred embodiments.

With respect to the upstream portion 12, the kiln car 14 is movably supported by a conventional mode of transporting products within a manufacturing environment such as a rail system (not shown) for movement to an unloading or staging position adjacent a robotic unloading structure 22. In this embodiment, the robotic unloading structure 22 incorporates a rigid steel robot supporting frame 22a which supports a conventional rear robot A and a conventional front robot B, as shown in FIGS. 1A, 1C and 2A. The kiln car 14 is designed to support stacks of bricks that are each lifted by robots A and B for further processing. In this preferred embodiment, the bricks on the kiln car 14 are divided into stacks S1, S2 and S3 in a transverse front row of the kiln car, stacks S4, S5 and S6 in a second transverse row and stacks S7, S8 and S9 in a third transverse row.

A transversely extending packaging conveyor 24 (FIG. 1A–1C) is positioned adjacent to and immediately downstream of the robotic unloading structure 22. In this embodiment, the packaging conveyor 24 is implemented as a conventional belt conveyor having a continuously moving upper conveyor belt flight 25 (FIG. 2A), which is continuously moved at a relatively slow speed from the rear portion 18 to the front portion 19 of the assembly. Alternatively, the packaging conveyor 24 may also be operated wherein the upper conveyor belt flight 25 is slowly indexed from the rear portion 18 to the front portion 19.

An outfeed conveyor 26 extends longitudinally adjacent and perpendicular to the packaging conveyor 24 in the rear portion 18 of the assembly 10. The outfeed conveyor 26 is implemented in this embodiments as a horizontal belt conveyor having an upper horizontal flight 27 which is operated to move in the upstream direction toward the packaging conveyor 24.

A longitudinally oriented tine conveyor 28 is provided in the front portion 19 of the assembly and has a horizontally extending upper flight 28a. The upper flight 28a is indexed at appropriate times in the upstream direction toward the packaging conveyor 24 by control signals from a programmable logic controller (PLC) 73 (FIG. 1D), as will be described further hereinbelow.

A distribution carriage structure 30 extends transversely across the downstream portion 16 of the assembly and perpendicular to the outfeed conveyor 26 and the tine conveyor 28. The distribution carriage structure 30 is positioned above position A28 of tine conveyor 28, position A20 of the infeed conveyor 20 and position A26 of the outfeed conveyor 26. As shown in FIGS. 3A and 3B, the distribution carriage structure 30 incorporates a support frame 30a, and a distribution carriage 31 positioned on the upper extent of the support frame 30a for transverse movement between a rear dwell position and a forward dwell position under the control of the programmable logic controller 73.

Also shown in FIGS. 3A and 3B, a forward pickup head 82 and a rear pickup head 83 are supported by the distribution carriage 31 with the pickup head 82 being positioned over and vertically aligned with position A28 of tine conveyor 28 and rear pickup head 83 being positioned over and vertically aligned with position A20 of the infeed conveyor 20 when carriage 31 is in a forward dwell position. When distribution carriage 31 is in a rear dwell position, forward pickup head 83 is vertically aligned with position A20 of infeed conveyor 20 and the rearward pickup head is positioned and aligned with position A26 of the outfeed conveyor 26.

Pickup heads 82 and 83 are of identical construction and each pickup head includes brick clamps 84 mounted on a vertically moveable turret 85 which can be rotated 90° and moved upwardly and downwardly relative to brick stack components on infeed conveyor 20. When carriage 31 is in its rear dwell position, clamps 84 can be moved downwardly over brick stack components in position A20 of the infeed conveyor 20 to clamp and lift a single layer of brick. The carriage then moves to its forward dwell position where the single layer of brick is rotated and lowered for deposit into position A28 of tine conveyor 28.

The rear pickup head 83 is identical to forward pickup head 82, and is mounted on distribution carriage 31 rearwardly of forward pickup head 82 so as to be in vertical alignment with position A20 of infeed conveyor 20 when carriage 31 is in its forward dwell position. When distribution carriage 31 is in its rear dwell position, the rear pickup head is in vertical alignment with position A26 of outfeed conveyor 26 and forward pickup head 82 is in vertical alignment with position A20 of infeed conveyor 20.

Tine carriage structure 32 includes a support frame 32a that provides support for a horizontally moveable tine carriage 33 which includes a pickup head 92 essentially identical to pickup head 82 of distribution carriage 31. Pickup head 92 includes downwardly moveable brick clamps 35 for engaging, lifting and rotating 90° the tine row pairs TP or row arrangement TA, such as a double-single-double row arrangement, in position B28 of the tine conveyor 28 for deposit on a single brick layer in position B26 of outfeed conveyor 26 in a manner and for a purpose to be further discussed.

Front robot B and rear robot A are conventional computer-controlled robots manufactured for an industrial environment. Examples of robots that can be use to implement robots A and B of the invention are robot Model Nos. M4101WW or M-4500, both manufactured by FANUC North America of Mason, Ohio. Each robot includes a base 40 rigidly attached to the steel robot support frame 22 as shown in FIGS. 3A and 3B. A rotary turret 42 is mounted for rotation about a vertical axis 44 with electric and hydraulic controls and power housing 46 being provided internally of the robot base 40 as shown in FIG. 3A.

Referring to FIGS. 2A, 2B, 3A and 3B, rotary turret 42 provides support for first and second parallel clamp frames 48 and 50 which are mounted for horizontal movement on a horizontal carrier beam 51 attached to a rotary disk 49, which is rotatable about axis 47. Disk 49 is mounted for controlled rotation about the vertical axis 47 of a vertical shaft provided in outer housing 53 on the outer end of an articulated main boom extending from the rotary turret 42.

The articulated boom includes a main boom 54 attached to rotary turret 42 for pivotal movement about horizontal axis 56 and an outer boom 68 mounted for pivotal movement about pivot axis 60 on the outer end portion of the main boom on 54. Outer housing 53 is pivotally attached for rotational movement about an outer pivot axis 64 adjacent the outer end of outer boom 68. Linkages 66 act to always maintain the vertical orientation of axis 47 and clamp frames 48 and 50.

The first and second clamp frames 48 and 50 are mounted for linear horizontal movement toward and away from each other controlled and provided by hydraulic cylinder 69. The hydraulic cylinder 69 is electrically controlled by signals from the programmable logic controller 73 and the clamp frames 48 and 50 when positioned in their fully opened position are spaced apart a sufficient distance to permit the clamps to move downwardly over the two upper layers of brick stacks on the kiln car for clamping the brick layers for movement by the robot assembly to infeed conveyor 20. The juncture of axis 47 with carrier beam 51 is positionable anywhere within the confines of boundary line 200 for any position of rotation within the confines of circular boundaries 300 (FIGS. 1A and 1C).

Stacks A1, B1, C1 and D1 of veneer board are provided on table 39 positioned rearwardly of outfeed conveyor 26 below and in vertical alignment with the tine carriage 33 when the carriage is in its rearmost position. Tine carriage clamp plates 35 are supported on the lower end of the tine carriage axially vertically positioned shaft 34 which can also be rotated. Tine carriage clamp plates 35 can be positioned a sufficient distance apart from each other to permit them to be lowered over a tine row layer TL,TP, or tine arrangement TA, brick course formed of three tine rows in position B28 of the tine conveyor 28. Clamp plates 35 are moved toward each other to engage the ends of tine rows in one tine row layer TL,TP or in one tine arrangement TA to enable the lifting of the tine rows TP or tine arrangement TA to the elevated position shown in FIG. 3B for subsequent rotation 90° for deposit on a single layer brick course 1X, or other number of layer(s) stack(s) of brick (nX), in position B26 of outfeed conveyor 26.

Tine carriage vertical positioning shaft 34 is moveable upwardly and downwardly in an axial direction and is also capable of rotation so as to orient a brick course 38 in a transverse orientation such as shown in position B26 of outfeed conveyor 26 form that shown in position B28 of tine conveyor 28 (FIGS. 1A and 1C). Tine row layer TL,TP or tine arrangement TA can also be oriented in a longitudinal orientation (FIG. 1B). The tine carriage vertical positioning shaft additionally includes an engaging element which can be lowered downwardly to engage and lift the top sheets of stacks of veneer boards A1, B1, C1 and D1, etc. for subsequent deposit on the top surface of a tine row layer TL,TP or TA such as course TB in position B26 of outfeed conveyor 26 as shown in FIGS. 1A–1C. The engaging element may be implemented using any conventional device or system, such as a plurality of suction cups (not shown), that would be applicable to similar industrial environment.

Timing control of the robots A and B, the conveyors 20,26,28, the tine carriage 33, the distribution carriage 31 and their associated clamp and drive systems is provided by a conventional programmable logic control 73 (FIG. 1D), such as those sold by the Allen-Bradley® division of Rockwell Automation. This is a logic control 73 being connected to the control mechanisms of at least robots A and B, the conveyors 20,26,28, the tine carriage structure 33 and the distribution carriage structure 31, as well as to multiple sensors 78,80 for monitoring the various stages of the process. The various sensors that would be connected to the programmable logic controller 73 include position sensors 78, for example to detect the presence or absence of the kiln car 14 or of bricks 2 or even of the tine or distribution carriages 33,31 at various stages, and movement sensors 80, such as for detecting or measuring the movement of the conveyors 20,26,28 or of bricks 2 on the conveyors, so as to be used in the controlling and the monitoring of the process as will be further explained hereinbelow.

Operation of the System

In the operation of the present invention, a sequence of operation of the assembly begins with all conveyors 20,26, 28 being fully empty. It is assumed that modular size bricks 2 are to be provided for forming brick packages, such as brick packages 100 and 100A, as shown in FIGS. 4A and 4B, respectively. Referring to FIG. 4A, each package 100 is formed of (a) nine solid layers L1, L2, L3, L4, L5, L6, L7, L8 and L9, each of which layer is eleven (11) bricks wide and five (5) bricks long, for example, and (b) one tine layer TL formed of three tine row pairs TP, positioned to provide two lengthwise extending tine receiving openings 36 dimensioned to receive the two tines of a fork lift, or other suitable clamping, moving or lifting means, for enabling movement of the finished brick package. In this embodiment, the line layer TL is positioned as the third layer from the bottom of package 100. Referring to FIG. 4B, each package 100A is formed of (a) nine solid layers L1a, L2a, L3a, L4a, L5a, L6a, L7a, L8a and L9a, each of which layer is eight (8) bricks wide and five (5) bricks long, for example, and (b) one tine layer TL,TPa formed of a single-double-single tine row arrangement TPa,TA, positioned to provide two lengthwise extending tine receiving openings 36a dimensioned to receive the two tines of a fork lift, or other suitable clamping, moving or lifting means, for enabling movement of the finished brick package. In this embodiment of FIG. 4B, the line layer TPa,TA is positioned as the fourth layer from the bottom of package 100A.

At the beginning of a sequence of operation, the kiln car 14 moves into position for unloading by robots A and B. The robot B and the robot A (FIGS. 2A and 2B), are initially operated to unload two upper layer stacks of brick from the brick stacks S1, S2 and S3 on the forward end of kiln car 14. Both robots A and B will progressively clamp and remove two-layer stacks 2X (FIG. 3B), or other number of layer(s) stack(s) of brick (nX), of brick at a time from the tops of brick stacks S1, S2 and S3. As used herein, "(nX)" can vary to represent a one-layer stack (1X), a two-layer stack (2X), a three-layer stack (3X), a four-layer stack (4X) or other suitable number layer stack (nX), dependent upon the use, application, or operation, and each recitation of "(nX)" herein can represent a different number of layer(s) stack from another recitation of "(nX)" herein, again dependent upon the use, application or operation. The two-layer stacks 2X, or other number of layer(s) stack(s) of brick (nX), are serially deposited onto infeed conveyor 20 at position C20, and then conveyed by the infeed conveyor 20 to position A20.

In the above described implementations of the system, each two-layer stack 2X, or other number of layer(s) stack(s) of brick (nX), is formed of two (or n) single layers 1X, or other number of layer(s) stack(s) of brick (nX), which are each ten (10) bricks wide by four (4) bricks long by one (1) brick thick, for example, (FIGS. 1A–1C). The removed two-layer stacks, or other number of layer(s) stack(s) of brick (nX), are placed by the robots A and B on infeed conveyor 20 at position C20 (FIG. 3B). Depending on the operation of the infeed conveyor 20, the placement of the two-layer stacks, or other number of layer(s) stack(s) of brick (nX), is coordinated between the actions of the robots A and B and movement of the infeed conveyor 20.

For example, if the infeed conveyor 20 is indexed, the two-layer stacks 2X, or other number of layer(s) stack(s) of brick (nX), are placed during stationery dwell periods of the infeed conveyor 20. The infeed conveyor 20 is indexed after the deposit of each two-layer stack 2X, or other number of layer(s) stack(s) of brick (nX), in position C20 so as to permit deposit of the next two-layer stack, or other number of layer(s) stack(s) of brick (nX), in position C20 with the process continuing until the downstream two-layer stack (the first two-layer stack, or other number of layer(s) stack(s) of brick (nX), deposited in position C20) is moved into downstream position A20 on infeed conveyor 20 which is beneath distribution carriage structure 30.

In this regard, a total of nine picks, or other suitable number of picks, of two-layer stacks 2X, or other number of layer(s) stack(s) of brick (nX), by the robots A and B will be set on the infeed conveyor 20 with each pick being separated from the others by the progressive (i.e., indexing) movement of the infeed conveyor 20 in the downstream direction, as illustrated in FIGS. 1A–1C.

Further, because of the rectangular shape of the bricks and subsequently of the one-layer or two-layer stacks of bricks, or other number of layer(s) stack(s) of brick (nX), the layers that are transferred onto the conveyors may be oriented such that their longitudinal axes L are either parallel or perpendicular to the direction of travel of the conveyors 20,26,28, with the direction of travel of the conveyors 20,26,28 being indicated by the arrows on the conveyors 20,26,28 in FIGS. 1A, 1B and 1C. For example, in the first embodiment as illustrated in FIG. 1A, the two-layer stacks 2X, or other number of layer(s) stack(s) of brick (nX), are transferred onto the infeed conveyor 20 parallel to the infeed conveyor's direction of travel, and the layers 1X, or other number of layer(s) stack(s) of brick (nX), are transferred onto the outfeed conveyor 26 parallel to outfeed conveyor's direction of travel, while the layers 1X, or other number of layer(s) stack(s) of brick (nX), transferred onto the tine conveyor 28 are positioned perpendicular to the tine conveyor's direction of travel.

In contrast, in the second embodiment and in the third embodiment as illustrated in FIGS. 1B and 1C, the two-layer stacks 2X, or other number of layer(s) stack(s) of brick (nX), are transferred onto the infeed conveyor 20 perpendicular to the infeed conveyor's direction of travel, while in FIG. 1C the layers 1X, or other number of layer(s) stack(s) of brick (nX), are transferred onto the outfeed conveyor 26 parallel to outfeed conveyor's direction of travel, while in FIG. 1B the layers 1X, or other number of layer(s) stack(s) of brick (nX), are transferred onto the outfeed conveyor 26 perpendicular to the outfeed conveyor's direction of travel, and in FIGS. 1B and 1C the layers 1X, or other number of layer(s) stack(s) of brick (nX), transferred onto the tine conveyor 28 are positioned perpendicular to the tine conveyor's direction of travel. While the overall operation of the system is essentially the same in the embodiments of FIGS 1A–1C, this difference in the orientation of the layers will, as explained further hereinbelow, will vary the specific operations of the robots A and B, the distribution carriage structure 30 and the tine carriage structure 32.

Robots A and B are automatically controlled to remove two-layer stacks 2X, or other number of layer(s) stack(s) of brick (nX), from the top of the stacks S1, S2 and S3 for deposit on infeed conveyor 20 or on packaging conveyor 24 until all of the front row stacks are depleted. With respect to the orientation of the layers as discussed above, the robots are controlled such that, as they pick up two-layer stacks 2X, or other number of layer(s) stack(s) of brick (nX), the robots maintain or translate (depending on the starting orientation of the two-layer stacks 2X, or other number of layer(s) stack(s) of brick (nX), on the kiln car 14) the orientation of the two-layer stacks 2X, or other number of layer(s) stack(s) of brick (nX), so as to deposit the layers onto the infeed conveyor 20 parallel to the infeed conveyor's direction of travel in the first embodiment of FIG. 1A. For the second and third embodiments of FIGS. 1B and 1C, the robots are controlled so as to maintain or translate (again depending on the starting orientation of the two-layer stacks 2X, or other number of layer(s) stack(s) of brick (nX), on the kiln cart 14)

the orientation of the two-layer stacks 2X, or other number of layer(s) stack(s) of brick (nX), so as to deposit the layers onto the infeed conveyor 20 perpendicular to the infeed conveyor's direction of travel.

Following depletion of the aforementioned front row stacks, the kiln car 14 is moved a specified distance forward beneath and through the steel robot support frame 22 (FIG. 2A) to accurately position the stacks S4, S5 and S6 defining the second row of stacks in the position previously occupied by the front row of stacks. The aforementioned procedures are continued, such as with respect to stacks S7, S8 and S9, until the brick have all been removed from the current kiln car 14. At that stage, the now-empty kiln car is moved away and a new full kiln car 14 is brought into position as shown in either FIG. 1A, 1B or 1C.

The infeed conveyor 20 delivers the unloaded two-layer stacks 2X, or other number of layer(s) stack(s) of brick (nX), to an unload or layer removal position A20 beneath distribution carriage structure 30 positioned over the downstream end of the infeed conveyor 20. Such two-layer stacks, or other number of layer(s) stack(s) of brick (nX), are supported for movement on the elevated distribution carriage support frame 30a. The distribution carriage 31 removes layers 1X, or other number of layer(s) stack(s) of brick (nX), from the infeed conveyor 20 and transfers them either onto the outfeed conveyor 26 or the tine conveyor 28. As the distribution carriage 31 removes brick layers from the infeed conveyor 20, the infeed conveyor continues to progressively advance more two-layer stacks 2X, or other number of layer(s) stack(s) of brick (nX), into the position A20.

The distribution carriage 31 in its forward position has its front or rear pickup head 82, 83 positioned over the two-layer brick stack in position A20 of infeed conveyor 20. The front or rear pickup head 82,83 is then lowered over the two-layer stack in position A20 and the clamp plates 84 are moved inwardly to grip and pick up the top layer 1X, or other number of layer(s) stack(s) of brick (nX), from the two-layer stack 2X, or other number of layer(s) stack(s) of brick (nX), in infeed conveyor position A20 while leaving behind the lowermost layer. The distribution carriage 31 will then move to its rearmost position so that the clamped brick layer will be positioned over position A26 of the outfeed conveyor 26 and then lowered onto position A26 of the outfeed conveyor 26.

Alternatively, based on the controlling operation of the programmable logic controller 73, the front or rear pickup head 82,83 of the distribution carriage 31 is lowered over the two-layer stack, or other number of layer(s) stack(s) of brick (nX), in position A20 and the clamp plates 84 are moved inwardly to grip and pick up the second layer 1X, or other number of layer(s) stack(s) of brick (nX), of the two-layer stack, or other number of layer(s) stack(s) of brick (nX), in infeed conveyor position A20. The distribution carriage 31 will then either (a) move again to its rearmost position so that the clamped brick layer will be positioned over position A26 of the outfeed conveyor 26 and then lowered onto position A26 of the outfeed conveyor 26, or (b) move to its frontmost position to place the clamped brick layer over the position A28 of the tine conveyor 28 and then lower the clamped brick layer onto position A28 of the tine conveyor 28.

Based on the orientation of the layers of bricks clamped by the distribution carriage 31, the distribution carriage may rotate the clamped layer of bricks by 90°. In the first embodiment of FIG. 1A, the distribution carriage 31 will not rotate the clamped brick layer being transferred to the outfeed conveyor 26 as the layers intended for the outfeed conveyor 26 are supposed to be positioned parallel to the outfeed conveyor's direction of travel. The distribution carriage 31 will, however, rotate the clamped brick layer being transferred to the tine conveyor 28 by 90° since those layers are supposed to be positioned perpendicular to the outfeed conveyor's direction of travel.

In the second embodiment of FIG. 1B, the distribution carriage 31 will not rotate the clamped brick layer being transferred to the outfeed conveyor 26 as the layers intended for the outfeed conveyor 26 in this embodiment are supposed to be positioned perpendicular to the outfeed conveyor's direction of travel. The distribution carriage 31 likewise will not rotate the clamped brick layer being transferred to the tine conveyor 28 by 90° since those layers are supposed to be positioned perpendicular to the outfeed conveyor's direction of travel.

Conversely, in the third embodiment of FIG. 1C, the distribution carriage 31 will rotate the clamped brick layer being transferred to the outfeed conveyor 26 by 90° as the layers intended for the outfeed conveyor 26 are supposed to be positioned parallel to the outfeed conveyor's direction of travel. The distribution carriage 31 will not, on the other hand, rotate the clamped brick layer being transferred to the tine conveyor 28 by 90° since those layers are supposed to be positioned perpendicular to the outfeed conveyor's direction of travel.

Outfeed conveyor 26 progressively moves the brick layer 1X, or other number of layer(s) stack(s) of brick (nX), (i.e., by indexing) placed by the distribution carriage 31 so as to position the brick layer beneath the tine carriage structure 32 elevated above the outfeed conveyor 26. The movement of the outfeed conveyor 26 thus opens a clear space in position A26 for receiving the next single brick layer 1X, or other number of layer(s) stack(s) of brick (nX), to be deposited by the distribution carriage 31 in the manner of the previous brick layer.

In the meantime, the infeed conveyor 20 also progressively moves (i.e., by indexing) the next two-layer stack 2X, or other number of layer(s) stack(s) of brick (nX), into position A20 of the infeed conveyor 20 so that the distribution carriage 31 can continue to transfer brick layers 1X, or other number of layer(s) stack(s) of brick (nX), to either the outfeed conveyor 26 or the tine conveyor 28.

Following positioning of the brick layers 1X, or other number of layer(s) stack(s) of brick (nX), onto the tine conveyor 28, the tine conveyor 28 will progressively move (i.e., indexing) the brick layers upstream giving an inspector/operator an opportunity to inspect the bricks 2 on that conveyor for defects and to cast out any unacceptable bricks 2. At the same time, while the tine conveyor 28 progressively moves the brick layers 1X, or other number of layer(s) stack(s) of brick (nX), upstream, the stop bar 29 is alternatingly raised and lowered. In the lowered position, the stop bar 29 blocks the progressive upstream movement of the row of bricks that contact the stop bar 29, while the row(s) just upstream of the stop bar 29 continue moving thereby creating a gap space g,ga, corresponding to the openings 36,36a of FIGS. 4A and 4B, between rows of bricks. In the first and third embodiments of FIGS. 1A and 1C, the operation of the stop bar 29 in conjunction with the upstream movement of the tine conveyor 28 is controlled such that tine row pairs TP of bricks 2 are formed. In the second embodiment of FIG. 1B, the operation of the stop bar 29 in conjunction with the upstream movement of the tine conveyor 28 is controlled such that tine row arrangement TA of a double-single-double or a single-double-singe arrangement TA of bricks 2 are formed.

In the preferred embodiments of FIGS. 1A and 1C, the tine row pairs TP each consist of two adjacent rows of four bricks 2, for example. The alternating raising and lowering of the stop bar 29 is controlled at predetermined time intervals to create a predetermined spacing g at least equal to the width of a lifting, moving or clamping means, such as a tine fork, for forming the openings 36 between the tine rows as shown by the positioning of the tine rows to the left of stop bar 29 in FIGS. 1A and 1C. In the preferred embodiment of FIG. 1B, the tine row arrangement TA each consist of an alternating arrangement of a double-single-double or a single-double single arrangement of adjacent rows of five bricks 2. The alternating raising and lowering of the stop bar 29 in FIG. 1B is controlled at predetermined time intervals to create a predetermined spacing ga at least equal to the width of a lifting, moving or clamping means, such as a tine fork, for forming the openings 36a between the tine rows as shown by the positioning of the tine rows to the left of stop bar 29 in FIG. 1B. Further, in the embodiments of FIGS. 1A, 1B and 1C, the distribution carriage 31 in the meantime is controlled to transfer brick layers 1X, or other number of layer(s) stack(s) of brick (nX), at intervals so as to build up and maintain a substantial number of brick to the right of stop bar 29 as shown in FIGS. 1A, 1B, and 1C.

In the embodiments of FIGS. 1A and 1C, at the frontmost position of the tine carriage structure 32, the tine layer TL,TP is created when three transversely extending tine row pairs TP, such as the three most upstream tine row pairs on the tine conveyor 28, arrive in position B28 (FIGS. 1A and 1C). That tine layer TL,TP is then ready for subsequent delivery to position B26 of outfeed conveyor 26 where they will be deposited on the top surface of a single brick layer 1X, or other number of layer(s) stack(s) of brick (nX), already in position B26 by virtue of the upstream movement of brick layers 1X, or other number of layer(s) stack(s) of brick (nX), by the outfeed conveyor 26. In the embodiment of FIG. 1B, at the front most position of the tine carriage structure 32, the tine layer arrangement TA is created when three transversely extending tine rows in either a double-single-double arrangement (two rows-space-one row-space-two rows arrangement, for a five brick rows, spaced arrangement) or a single-double-single arrangement (one row-space-two rows-space-one row arrangement, for a four brick rows, spaced arrangement) of rows of bricks 2, such as the five most upstream tine rows of bricks 2 on the tine conveyor 28, arrive in position B28 (FIG. 1B). That tine layer arrangement TA is then ready for subsequent delivery to position B26 of outfeed conveyor 26 where they will be deposited on the top surface of a single brick layer 1X, or other number of layer(s) stack(s) of brick (nX), already in position B26 by virtue of the upstream movement of brick layers 1X, or other number of layer(s) stack(s) of brick (nX), by the outfeed conveyor 26, or placed at position B26 by a suitable transfer, lifting or moving means, such as a robot similar to the Robot A or the Robot B.

The tine carriage 33 removes the tine row pairs TP or the tine arrangement TA from position B28 of tine conveyor 28, and stacks the tine row pairs TP or tine arrangement TA on top of the veneer boards TB or on a brick layer 1X at position B26, or other number of layer(s) stack(s) of brick (nX), thereby forming a tine layer TL. Specifically, the clamp plates 35 of the tine carriage 33 which are oriented in a transverse orientation relative to the direction of travel of the outfeed conveyor 28 are positioned over the tine row pairs TP or over the tine arrangement TA, lowered and clamped against the opposite longitudinal ends of the tine row pairs TP or tine arrangement TA to engage and retain the tine row pairs TP or the tine arrangement TA. In the embodiments of FIGS. 1A and 1C, the three clamped tine row pairs TP are then lifted vertically and rotated 90° as shown in FIGS. 1A and 1C, and moved to the outfeed conveyor position B26 where they are deposited on the veneer boards TB or on a brick layer 1X, or other number of layer(s) stack(s) of brick (nX), previously positioned in position B26. In the embodiments of FIGS. 1B, the three clamped tine row arrangement TA are then lifted vertically and are not rotated 90° as shown in FIG. 1B, and moved to the outfeed conveyor position B26 where they are deposited on the veneer boards TB or on a brick layer 1X, or other number of layer(s) stack(s) of brick (nX), previously positioned in position B26.

With the depositing of the tine row pairs TP or the tine arrangement TA, the vacuum heads attached to the tine carriage 33 will pick up the top veneer boards from stacks A1, B1, C1 and D1. The veneer boards are then deposited on the upper surface of the tine row pairs TP or on the upper surface of the tine row arrangement TA which were deposited on the veneer boards TB or on the brick layer 1X, or other number of layer(s) stack(s) of brick (nX), in position B26 of outfeed conveyor 26. With the single brick layer 1X, or other number of layer(s) stack(s) of brick (nX), the tine layer TL and the veneer boards in place, the assembled tine receiving layer arrangement TR is moved by the outfeed conveyor 26 to its final most upstream position C26. At the same time, the next downstream single brick layer 1X, or other number of layer(s) stack(s) of brick (nX), is advanced into position B26 of outfeed conveyor 26 to repeat the above procedure. It is also possible that the outfeed conveyor 26 can be controlled so as not to position single brick layer 1X, or other number of layer(s) stack(s) of brick (nX), into position B26 of outfeed conveyor 26, so that the assembled tine receiving layer arrangement TR is only the tine row pairs TP or the tine row arrangement TA from the tine conveyor 28 at position B28.

While the foregoing operations are occurring, robot A in addition to transferring two-layer stacks 2X, or other number of layer(s) stack(s) of brick (nX), from the kiln car 14 to the infeed conveyor 20 is also being controlled to transfer two-layer stacks of brick 2X, or other number of layer(s) stack(s) of brick (nX), to position A24 of the packaging conveyor 24. That two-layer stack 2X, or other number of layer(s) stack(s) of brick (nX), will form the initial layers of a stack of bricks 2 to be packaged as assembled package PPA. Alternatively, assembled tine receiving layer arrangement TR from the outfeed conveyor 26 at position B26 can form the initial layer(s) of a stack of bricks 2 to be packaged as assembled package PPA. With the preferred embodiments described above, the packaging conveyor 24 is typically not controlled so as to index the movement of the bricks 2 placed on its upper flight. Rather, in the two embodiments, the upper flight is moving at a rate of, as an example, about 4–6 inches per minute in a rear-to-front direction toward the strapping station 77. It should be understood that other speeds for the movement of the upper flight or the indexing of the upper flight can be implemented in further embodiments, as would be understood by one of skill in the art.

After the two-layer stack, or other number of layer(s) stack(s) of brick (nX), is placed on position A24 on the packaging conveyor 24, robot A (or alternatively Robot B) reaches over to the outfeed conveyor position C26, picks up the assembled tine receiving layer arrangement TR and places it directly on top of the previously deposited two-layer stack, or other number of layer(s) stack(s) of brick (nX), thereby becoming a partially assembled package PPB at position B24. Alternatively, as mentioned previously, when the assembled tine receiving layer arrangement TR from the outfeed conveyor 26 at position B26 forms the initial layer(s) of a stack of bricks 2 to be packaged as assembled package PPA, the Robot A (or alternatively the Robot B), can deposit none or other number of layer(s) stack(s) of brick (nX) on the assembled tine receiving layer arrangement TR at position B24 thereby becoming a partially assembled package PPB. At that point, the packaging conveyor 24 advances the partially assembled package PPB to the next adjacent position C24.

At the same time, robot A then transfers the next two-layer stack 2X, or other number of layer(s) stack(s) of brick (nX), from the kiln car 14, or alternatively transfers the assembled tine receiving layer arrangement TR from position C26, to the position A24, which is directly behind the previous partially assembled package PPB that advanced to position B24 on the packaging conveyor 24. As the packaging conveyor continues to move, robot A or robot B will first place further a two-layer stack 2X, or other number of layer(s) stack(s) of brick (nX), or may alternatively place no additional stack(s) of bricks (nX), from the kiln car 14 onto the partially assembled package PPB which has advanced further to position C24 becoming a further assembled package PPC, and then transfer the partially assembled package PPA including the assembled tine receiving layer arrangement TR to occupy the position B24 (that next stack package now PPB), and then transfer another two-layer stack, or other number of layer(s) stack(s) of brick (nX), or alternatively transfers the assembled tine receiving layer arrangement TR from position C26, onto position A24 in order to start yet another package PPA for assembly.

Alternatively, robot B may also transfer a two-layer stack, or other number of layer(s) stack(s) of brick (nX), from the kiln car 14 onto the partially assembled package PPB at position C24 to form the further assembled package PPC. Robots A and B may alternatingly perform the function of transferring a two-layer stack, or other number of layer(s) stack(s) of brick (nX), to position C24, or the programmable logic controller 73 may determine which robot to use during operation. For example, the programmable logic controller 73 can make such a determination based on specific parameters derived from sensory inputs which would indicate which robot was in the best position to perform the function for position C24.

As the partially assembled packages on the packaging conveyor 24 progress, robot B (or alternatively or alternately Robot A) will place a two-layer stack, or other number of layer(s) stack(s) of brick (nX), or may alternatively place no additional stack(s) of bricks (nX), on the partially assembled package PPC which is now in position D24, thereby becoming a partially assembled package PPD. In the meantime, robot A is continuing to transfer two-layer stacks, or other number of layer(s) stack(s) of brick (nX), or an assembled tine receiving layer arrangement TR to the appropriate positions on the packaging conveyor 24, such that packages of bricks 2 PPA, PPB and PPC are continuously being formed as the packaging conveyor 24 advances.

When the partially assembled package PPD advances to the position E24 of the packaging conveyor 24, robot B (or alternatively or alternately Robot A) will place another two-layer stack, or other number of layer(s) stack(s) of brick (nX), or may alternatively place no additional stack(s) of bricks (nX), thereby forming a further assembled package PPE at position E24. Robot B or robot A will then transfer another two-layer stack, or other number of layer(s) stack(s) of brick (nX), from the kiln car 14, or may alternatively place no additional stack(s) of bricks (nX), to the partially assembled package now occupying position D24 in order to form another partially assembled package PPD. As is evident from the foregoing, the programmable logic controller 73 can control the forming of the assembled packages PPA-PPE at positions A24 through E24 of the packaging conveyor 24 so that none or a predetermined number of layer(s) stack(s) of brick (nX) are transferred or positioned on none or any number of layer(s) stack(s) of brick (nX) at any of positions A234 through E24 to form a predetermined packaged assembly of a corresponding number of layer(s) stack(s) of brick (nX) including the assembled tine receiving layer arrangement TR, dependent upon the particular need, use or application.

As the packages continue to move forward on the packaging conveyor 24, they will enter the strapping station 77 that is equipped with a moveable carriage 77a. The movable carriage 77a is connected to a hydraulic cylinder 310 that is operated so as to move the movable carriage 77a at the same speed as the packaging conveyor 24. The strapping station 77 further includes strapping structure 77b which applies straps around the moving brick stacks, such as by a suitable known binding or strapping apparatus. The brick stacks initially move past guide rollers 320, with the arrangements of the guide rollers 320 also being illustrated in FIGS. 5A through 5E, pre-compressor plates 330 and the compressor plates 340, which clamp the column of moving brick following which the strappers apply all of the straps. As can be seen from FIGS. 2A and 5A–E, the guide rollers 320 include a plurality of arrangements 320 to accommodate a corresponding number of layers of bricks 2 to form an assembly of bricks 2, such as assemblies 100 and 100A of FIGS. 4A and 4B, for example, of a predetermined number of layers of bricks 2 forming the final assembly. For example, with reference to packaging conveyor 24 of FIG. 2A, the guide roller section 320 of FIG. 5D is positioned at position A24 for positioning and aligning up to two layers of bricks 2, the guide roller section 320 of FIG. 5C is positioned at position B24 for positioning and aligning up to four layers of bricks 2, the guide roller section 320 of FIG. 5B is positioned at position C24 for positioning and aligning up to six layers of bricks 2, the guide roller section 320 of FIG. 5A is positioned at position D24 for positioning and aligning up to eight layers of bricks 2, and the guide roller section 320 positioned at position E24 in FIG. 2A is for positioning and aligning up to ten layers of bricks 2, for example. When the strapping operation is complete the pre-compressors 330 and compressors 340 release and the carriage returns to the left to its home position to await the next arriving brick package.

It should be understood that the foregoing description is just one example of how the system may be operated in order to build one type of package having a specific number of bricks 2 with specific dimensions. However, other generally similar sequences of operation for other types of packages of different bricks 2 may be programmed into the programmable logic controller 73.

After strapping, the packs of brick are accumulated into five strap packs, or other suitable arrangement. These packs separate from the column by a system of powered rollers and are transported to a 90° pusher where they are cross-strapped in a conventional manner and presented for pick up by a suitable lifting, clamping, moving or lifting means, such as by a forklift, which is easily accomplished by virtue of the fact that the tine openings in the pack are sized and positioned to accommodate the lifting, clamping or moving means, such as the forklift lifting bars.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents can be resorted to, falling within the scope of the invention.

Although the present invention has been fully described in connection with the preferred embodiments thereof with reference to the accompanying drawings, it is to be noted that various changes and modifications will be apparent to those skilled in the art. For example, the tine row arrangement of the brick or component rows can vary from the tine row pairs of FIGS. 1A and 1C, or from the double-single-double or the single-double-single tine row arrangement of FIG. 1B, dependent upon the use and application, to provide the respective openings in the bundled assembly or structure of bricks or other components, such as a one-three-one or a two-four-two arrangement of bricks or components, utilizing the methods and apparatus of the present invention, as previously described. Such changes and modifications are to be understood as included within the scope of the present invention as defined by the appended claims, unless they depart therefrom.

What is claimed is:

1. An apparatus for arranging components into an assembly, comprising:
   a first conveyor means for receiving and for transporting successive layers of components to a distribution position;
   a distribution means located at the distribution position for selectively repositioning the successive layers of components from the first conveyor means;
   a second outfeed conveyor means for receiving from the distribution means selected layers of the successive layers of components repositioned on the second outfeed conveyor means by the distribution means and for transporting the selected layers of the successive layers of components to an outfeed conveyor position;
   a third tine conveyor means for receiving from the distribution means other selected layers of the successive layers of components repositioned on the third tine conveyor means by the distribution means and for transporting components of the other selected layers of the successive layers of components to a tine conveyor position;
   a separating means positioned with the third tine conveyor means for separating the components of the other selected layers of the successive layers of components repositioned on the third tine conveyor means into an arrangement of rows spaced apart to provide for at least one opening in the arrangement of rows to form a tine receiving layer;
   a carriage means for transporting the tine receiving layer from the tine conveyor position to the outfeed conveyor position and for positioning the tine receiving layer at the outfeed conveyor position of the second outfeed conveyor means; and
   a transferring means for positioning at least one layer of components including the tine receiving layer for forming an assembly of components including the at least one opening in the tine receiving layer.

2. The apparatus of claim 1, wherein the components comprise bricks.

3. The apparatus of claim 1, further comprising:
   a binding means for binding the assembly of components into an integrated structure.

4. The apparatus of claim 4, further comprising:
   a controller for controlling the operation of the first conveyor means, the distribution means, the second outfeed conveyor means, the third tine conveyor means, the separating means, the carriage means, the transferring means, and the binding means to form the assembly of components and to bind the assembly of components into the integrated structure.

5. The apparatus of claim 4, wherein the components comprise bricks.

6. The apparatus of claim 1, further comprising:
   a controller for controlling the operation of the first conveyor means, the distribution means, the second outfeed conveyor means, the third tine conveyor means, the separating means, the carriage means, and the transferring means to form the assembly of components.

7. The apparatus of claim 6, wherein the components comprise bricks.

8. The apparatus of claim 1, further comprising:
   a packaging conveyor means for receiving, from the transferring means, layers of components, including the tine receiving layer, including a guiding means arranged for successively positioning and aligning a corresponding number of layers of components at various positions on the packaging conveyor means for forming the assembly of components of a predetermined number of layers of components.

9. The apparatus of claim 8, further comprising:
   a binding means for binding the assembly of components into an integrated structure.

10. The apparatus of claim 9, further comprising:
    a controller for controlling the operation of the first conveyor means, the distribution means, the second outfeed conveyor means, the third tine conveyor means, the separating means, the carriage means, the transferring means, the packaging conveyor means and the binding means to form the assembly of components and to bind the assembly of components into the integrated structure.

11. The apparatus of claim 10, wherein the components comprise bricks.

12. The apparatus of claim 10, wherein the carriage means transports the tine receiving layer from the tine conveyor position to the outfeed conveyor position and positions the tine receiving layer on a layer of the selected layers of components positioned at the outfeed conveyor position of the second outfeed conveyor means; and
    the transferring means positions at least one layer of components over the tine receiving layer to form the assembly of components including the at least one opening in the tine receiving layer.

13. The apparatus of claim 12, wherein the components comprise bricks.

14. The apparatus of claim 10, wherein the first conveyor means transports the successive layers of components to the distribution position with a longitudinal axis of the successive layers of components being oriented by the transferring means parallel to a direction of travel of the first conveyor means;
    the distribution means located at the distribution position selectively repositions and orients the longitudinal axis of the successive layers of components from the first conveyor means;
    the second outfeed conveyor means receives from the distribution means the selected layers of the successive layers of components repositioned and oriented on the second outfeed conveyor means by the distribution means with the longitudinal axis of the selected layers of the successive layers of components being oriented parallel to a direction of travel of the second outfeed conveyor means and transports the selected layers of the successive layers of components to the outfeed conveyor position; and the third tine conveyor means receives from the distribution means the other selected layers of the successive layers of components repositioned and oriented on the third tine conveyor means by the distribution means with the longitudinal axis of the other selected layers of the successive layers being oriented perpendicular to a direction of travel of the third tine conveyor means and transports the components of the other selected layers of the successive layers of components to the tine conveyor position.

15. The apparatus of claim 14, wherein the components comprise bricks.

16. The apparatus of claim 14, wherein
the separating means positioned with the third tine conveyor means separates the components of the other selected layers of the successive layers of components repositioned on the third tine conveyor means into an arrangement of pairs of rows spaced apart to provide at least one pair of openings in the arrangement of rows to form the tine receiving layer.

17. The apparatus of claim 16, wherein the components comprise bricks.

18. The apparatus of claim 10, wherein
the first conveyor means transports the successive layers of components to the distribution position with a longitudinal axis of the successive layers of components being oriented by the transferring means perpendicular to a direction of travel of the first conveyor means;

the distribution means located at the distribution position selectively repositions and orients the longitudinal axis of the successive layers of components from the first conveyor means;

the second outfeed conveyor means receives from the distribution means the selected layers of the successive layers of components repositioned and oriented on the second outfeed conveyor means by the distribution means with the longitudinal axis of the selected layers of the successive layers of components being oriented perpendicular to a direction of travel of the second outfeed conveyor means and transports the selected layers of the successive layers of components to the outfeed conveyor position; and the third tine conveyor means receives from the distribution means the other selected layers of the successive layers of components repositioned and oriented on the third tine conveyor means by the distribution means with the longitudinal axis of the other selected layers of the successive layers of components being oriented perpendicular to a direction of travel of the third tine conveyor means and transports the components of the other selected layers of the successive layers of components to the tine conveyor position.

19. The apparatus of claim 18, wherein the components comprise bricks.

20. The apparatus of claim 18, wherein the separating means positioned with the third tine conveyor means separates the components of the other selected layers of the successive layers of components repositioned on the third tine conveyor means into an arrangement including at least one pair of rows spaced apart from at least one single row to provide at least one pair of openings in the arrangement of rows to form the tine receiving layer.

21. The apparatus of claim 20, wherein the components comprise bricks.

22. The apparatus of claim 20, wherein the arrangement of rows forming the tine receiving layer comprises a double-single-double arrangement of rows.

23. The apparatus of claim 22, wherein the components comprise bricks.

24. The apparatus of claim 20, wherein the arrangement of rows forming the tine receiving layer comprises a single-double-single arrangement of rows.

25. The apparatus of claim 24, wherein the components comprise bricks.

26. The apparatus of claim 10, wherein the first conveyor means transports the successive layers of components to the distribution position with a longitudinal axis of the successive layers of components being oriented by the transferring means perpendicular to a direction of travel of the first conveyor means;

the distribution means located at the distribution position selectively repositions and orients the longitudinal axis of the successive layers of components from the first conveyor means;

the second outfeed conveyor means receives from the distribution means the selected layers of the successive layers of components repositioned and oriented on the second outfeed conveyor means by the distribution means with the longitudinal axis of the selected layers of the successive layers of components being oriented parallel to a direction of travel of the second outfeed conveyor means and transports the selected layers of the successive layers of components to the outfeed conveyor position; and the third tine conveyor means receives from the distribution means the other selected layers of the successive layers of components repositioned and oriented on the third tine conveyor means by the distribution means with the longitudinal axis of the other selected layers of the successive layers of components being oriented perpendicular to a direction of travel of the third tine conveyor means and transports the components of the other selected layers of the successive layers of components to the tine conveyor position.

27. The apparatus of claim 26, wherein the components comprise bricks.

28. The apparatus of claim 26, wherein the separating means positioned with the third tine conveyor means separates the components of the other selected layers of the successive layers of components repositioned on the third tine conveyor means into an arrangement of pairs of rows spaced apart to provide at least one pair of openings in the arrangement of rows to form the tine receiving layer.

29. The apparatus of claim 28, wherein the components comprise bricks.

30. The apparatus of claim 1, wherein the carriage means transports the tine receiving layer from the tine conveyor position to the outfeed conveyor position and positions the tine receiving layer on a layer of the selected layers of the successive layers of components positioned at the outfeed conveyor position of the second outfeed conveyor means; and the transferring means positions at least one layer of components over the tine receiving layer to form the assembly of components including the at least one opening in the tine receiving layer.

31. The apparatus of claim 30, wherein the components comprise bricks.

32. The apparatus of claim 1, wherein the first conveyor means transports the successive layers of components to the distribution position with a longitudinal axis of the successive layers of components being oriented by the transferring means parallel to a direction of travel of the first conveyor means;

the distribution means located at the distribution position selectively repositions and orients the longitudinal axis of the successive layers of components from the first conveyor means;

the second outfeed conveyor means receives from the distribution means the selected layers of the successive layers of components repositioned and oriented on the second outfeed conveyor means by the distribution means with the longitudinal axis of the selected layers of the successive layers of components being oriented parallel to a direction of travel of the second outfeed conveyor means and transports the selected layers of the successive layers of components to the outfeed conveyor position; and the third tine conveyor means receives from the distribution means the other selected layers of the successive layers of components repositioned and oriented on the third tine conveyor means by the distribution means with the longitudinal axis of the other selected layers of the successive layers of components being oriented perpendicular to a direction of travel of the third tine conveyor means and transports the components of the other selected layers of the successive layers of components to the tine conveyor position.

33. The apparatus of claim 32, wherein the components comprise bricks.

34. The apparatus of claim 32, wherein the separating means positioned with the third tine conveyor means separates the components of the other selected layers of the successive layers of components repositioned on the third tine conveyor means into an arrangement of pairs of rows spaced apart to provide at least one pair of openings in the arrangement of rows to form the tine receiving layer.

35. The apparatus of claim 34, wherein the components comprise bricks.

36. The apparatus of claim 1, wherein the first conveyor means transports the successive layers of components to the distribution position with a longitudinal axis of the successive layers of components being oriented by the transferring means perpendicular to a direction of travel of the first conveyor means;

the distribution means located at the distribution position selectively repositions and orients the longitudinal axis of the successive layers of components from the first conveyor means;

the second outfeed conveyor means receives from the distribution means the selected layers of the successive layers of components repositioned and oriented on the second outfeed conveyor means by the distribution means with the longitudinal axis of the selected layers of the successive layers of components being oriented perpendicular to a direction of travel of the second outfeed conveyor means and transports the selected layers of the successive layers of components to the outfeed conveyor position; and the third tine conveyor means receives from the distribution means the other selected layers of the successive layers of components repositioned and oriented on the third tine conveyor means by the distribution means with the longitudinal axis of the other selected layers of the successive layers of components being oriented perpendicular to a direction of travel of the third tine conveyor means and transports the components of the other selected layers of the successive layers of components to the tine conveyor position.

37. The apparatus of claim 36, wherein the components comprise bricks.

38. The apparatus of claim 36, wherein the separating means positioned with the third tine conveyor means separates the components of the other selected layers of the successive layers of components repositioned on the third tine conveyor means into an arrangement including at least one pair of rows spaced apart from at least one single row to provide at least one pair of openings in the arrangement of rows to form the tine receiving layer.

39. The apparatus of claim 38, wherein the components comprise bricks.

40. The apparatus of claim 38, wherein the arrangement of rows forming the tine receiving layer comprises a double-single-double arrangement of rows.

41. The apparatus of claim 40, wherein the components comprise bricks.

42. The apparatus of claim 38, wherein the arrangement of rows forming the tine receiving layer comprises a single-double-single arrangement of rows.

43. The apparatus of claim 42, wherein the components comprise bricks.

44. The apparatus of claim 1, wherein the first conveyor means transports the successive layers of components to the distribution position with a longitudinal axis of the successive layers of components being oriented by the transferring means perpendicular to a direction of travel of the first conveyor means;

the distribution means located at the distribution position selectively repositions and orients the longitudinal axis of the successive layers of components from the first conveyor means;

the second outfeed conveyor means receives from the distribution means the selected layers of the successive layers of components repositioned and oriented on the second outfeed conveyor means by the distribution means with the longitudinal axis of the selected layers of the successive layers of components being oriented parallel to a direction of travel of the second outfeed conveyor means and transports the selected layers of the successive layers of components to the outfeed conveyor position; and the third tine conveyor means receives from the distribution means the other selected layers of the successive layers of components repositioned and oriented on the third tine conveyor means by the distribution means with the longitudinal axis of the other selected layers of the successive layers of components being oriented perpendicular to a direction of travel of the third tine conveyor means and transports the components of the other selected layers of the successive layers of components to the tine conveyor position.

45. The apparatus of claim 44, wherein the components comprise bricks.

46. The apparatus of claim 44, wherein the separating means positioned with the third tine conveyor means separates the components of the other selected layers of the successive layers of components repositioned on the third tine conveyor means into an arrangement of pairs of rows spaced apart to provide at least one pair of openings in the arrangement of rows to form the tine receiving layer.

47. The apparatus of claim 46, wherein the components comprise bricks.

* * * * *